US012027074B2

(12) United States Patent
Oetzel et al.

(10) Patent No.: US 12,027,074 B2
(45) Date of Patent: Jul. 2, 2024

(54) ADHESIVE LABEL FOR A MULTI-PART CONTAINER, SYSTEM AND METHOD FOR APPLYING AN ADHESIVE LABEL TO A MULTI-PART CONTAINER

(71) Applicant: Schreiner Group GmbH & Co. KG, Oberschleissheim (DE)

(72) Inventors: Nadine Oetzel, Munich (DE); Stefan Krauss, Munich (DE); Kerstin Klingen, Munich (DE); Andreas Hofenauer, Munich (DE); Tanja Messmer, Renningen (DE); Robert Unglert, Munich (DE)

(73) Assignee: SCHREINER GROUP GMBH & CO. KG, Oberschleissheim (DE)

( * ) Notice: Subject to any disclaimer, the term of this patent is extended or adjusted under 35 U.S.C. 154(b) by 96 days.

(21) Appl. No.: 17/960,308

(22) Filed: Oct. 5, 2022

(65) Prior Publication Data

US 2023/0023532 A1 Jan. 26, 2023

Related U.S. Application Data

(62) Division of application No. 17/786,618, filed as application No. PCT/EP2020/081865 on Nov. 12, 2020.

(51) Int. Cl.
*G09F 3/02* (2006.01)
*G09F 3/00* (2006.01)
(Continued)

(52) U.S. Cl.
CPC .......... *G09F 3/0288* (2013.01); *G09F 3/0292* (2013.01); *G09F 3/0341* (2013.01);
(Continued)

(58) Field of Classification Search
CPC .... G09F 3/0288; G09F 3/0292; G09F 3/0341; G09F 3/10; G09F 2003/0269; G09F 2003/0272; G09F 2003/0273
See application file for complete search history.

(56) References Cited

U.S. PATENT DOCUMENTS 3,523,623 A 8/1970 Dorn
4,540,101 A * 9/1985 Kutcher ............ B65D 55/0818 215/252

(Continued)

FOREIGN PATENT DOCUMENTS

EP 1 566 786 A1 8/2005
EP 1 169 075 B1 11/2006

(Continued)

OTHER PUBLICATIONS

International Search Report in PCT/EP2020/081865, mailed Mar. 12, 2021.

(Continued)

*Primary Examiner* — Gary C Hoge
(74) *Attorney, Agent, or Firm* — Collard & Roe, P.C.

(57) ABSTRACT

An adhesive label for a multi-part container having a threaded member and a container body includes a first, sheet-like label portion adapted to be attached to the threaded member of the container, and a second label portion adjacent the first label portion and adapted to be attached to the container body of the container. The second label portion has a comb-like structure with strip-shaped fixing elements such that the adhesive label couples the threaded member to the container body relative to a condition applied to the container and opposes movement of the threaded member relative to the container body.

15 Claims, 10 Drawing Sheets

(51) Int. Cl.
*G09F 3/03* (2006.01)
*G09F 3/10* (2006.01)

(52) U.S. Cl.
CPC ........ *G09F 3/10* (2013.01); *G09F 2003/0269* (2013.01); *G09F 2003/0272* (2013.01); *G09F 2003/0273* (2013.01)

(56) References Cited

U.S. PATENT DOCUMENTS

| | | | | |
|---|---|---|---|---|
| 5,048,711 | A * | 9/1991 | Weiss | B65D 55/06 215/230 |
| 5,727,819 | A * | 3/1998 | Grosskopf | G09F 3/0289 283/81 |
| 6,146,729 | A | 11/2000 | Nihda | |
| 6,276,725 | B1 * | 8/2001 | Laurash | G09F 3/0292 40/313 |
| 6,908,113 | B2 * | 6/2005 | Chaduc | G09F 3/0292 206/460 |
| 6,955,000 | B2 | 10/2005 | Pawlik et al. | |
| 7,141,286 | B1 * | 11/2006 | Kessler | A61M 5/3202 215/230 |
| 7,255,689 | B2 | 8/2007 | Westbye | |
| 9,463,138 | B2 * | 10/2016 | McClain | B65D 51/245 |
| 2003/0047937 | A1 * | 3/2003 | Chaduc | G09F 3/0292 283/81 |
| 2007/0176410 | A1 * | 8/2007 | Unglert | G09F 3/10 283/67 |
| 2007/0222232 | A1 * | 9/2007 | Held | G09F 3/0292 292/307 R |
| 2009/0233067 | A1 * | 9/2009 | Doornheim | C09J 7/29 428/209 |
| 2009/0314775 | A1 * | 12/2009 | Dietrich | G09F 3/0292 283/81 |
| 2010/0305506 | A1 * | 12/2010 | Fahrer | A61M 5/14546 604/118 |
| 2014/0249479 | A1 * | 9/2014 | Pfrang | A61M 5/3213 156/60 |
| 2015/0090625 | A1 * | 4/2015 | Bauss | B65D 23/085 206/459.5 |
| 2020/0164161 | A1 * | 5/2020 | Murray | A61M 5/5086 |
| 2023/0146326 | A1 | 5/2023 | Garza et al. | |

FOREIGN PATENT DOCUMENTS

| | | | |
|---|---|---|---|
| EP | 2 014 570 | A1 | 1/2009 |
| EP | 2 962 715 | A1 | 1/2016 |
| JP | 3187139 | B2 | 7/2001 |
| JP | 3767712 | B2 | 4/2006 |
| JP | 2008-067832 | A | 3/2008 |
| JP | 2010-233838 | A | 10/2010 |
| JP | 4646658 | B2 | 3/2011 |
| JP | 4960676 | B2 | 6/2012 |
| JP | 2016-120164 | A | 7/2016 |
| JP | 2016-190663 | A | 11/2016 |
| WO | 2004/052432 | A2 | 6/2004 |
| WO | 2005/091255 | A1 | 9/2005 |
| WO | 2013/167701 | A1 | 11/2013 |

OTHER PUBLICATIONS

German Search Report in DE 10 2019 134 927.3, dated Sep. 10, 2020, with English translation of relevant parts.

* cited by examiner

ADHESIVE LABEL FOR A MULTI-PART CONTAINER, SYSTEM AND METHOD FOR APPLYING AN ADHESIVE LABEL TO A MULTI-PART CONTAINER

CROSS REFERENCE TO RELATED APPLICATIONS

This application is a divisional of and Applicant claims priority under 35 U.S.C. §§ 120 and 121 of U.S. patent application Ser. No. 17/786,618 filed on Jun. 17, 2022, which application is a national stage application under 35 U.S.C. § 371 of PCT Application No. PCT/EP2020/081865 filed on Nov. 12, 2020, which claims priority under 35 U.S.C. § 119 from German Patent Application No. 10 2019 134 927.3 filed on Dec. 18, 2019, the disclosures of each of which are hereby incorporated by reference. A certified copy of priority German Patent Application No. 10 2019 134 927.3 is contained in parent U.S. patent application Ser. No. 17/786,618. The International Application under PCT article 21(2) was not published in English.

BACKGROUND OF THE INVENTION

1. Field of the Invention

The present invention relates to an adhesive label for a multi-part container, which can contribute in a simple and cost-effective manner to a reliable coupling of container components as well as to a secure tamper protection for the container. The invention also relates to a system comprising such an adhesive label and a multi-part container, as well as a method for applying such an adhesive label to a multi-part container.

2. Description of the Related Art

In particular, a label may be used for identification or proof of origin in relation to an object to be labelled. For example, labels are used when it is necessary to indicate ingredients of a vessel. This applies in particular to receptacles in the pharmaceutical and medical fields, the contents of which are to be protected against manipulation.

SUMMARY OF THE INVENTION

It is a task underlying the invention to contribute to a reliable hold of components of a multi-part container in a simple and cost-effective manner.

The task is solved by an adhesive label, by a system and by a method for applying an adhesive label having the features of the respective independent patent claims. Advantageous embodiments of the adhesive label, the system and the method are indicated in the respective dependent patent claims.

According to one aspect of the invention, an adhesive label for a multi-part container with a threaded member and a container body has a first, flat label portion which is configured to be attached to the threaded element of the container. The adhesive label further comprises a second label portion adjacent to the first label portion and having a comb-like structure with a plurality of strip-shaped fixing elements. The second label portion with the fixing elements is adapted to be attached to the container body of the container so that the adhesive label couples the threaded member to the container body and resists movement of the threaded member relative to the container body.

By means of the described adhesive label, a reliable and cost-effective fixation of a threaded member to the associated body can be realized and it can also contribute to a secure protection against manipulation. The adhesive label is particularly suitable for packaging or vessels in the pharmaceutical field, such as syringes, injection vials or vials, which usually comprise a threaded member that is placed or plugged onto the associated vessel body.

The threaded member comprises, for example, a section with an internal thread which forms a kind of threaded head adjacent to a section which allows it to be placed or plugged onto the container body. Alternatively, the threaded member is threaded on its entire outer surface. In particular, the threaded portion is coupled to a closure which forms a cap of the container and securely closes it.

It is a finding in connection with the present invention that, for example, in the case of glass syringes with a Luer-lock system, the threaded member, which is usually formed of a plastic part and provided with a threaded portion, is fitted on the front of the glass syringe. The fastening of such a plastic threaded element is done by mechanical interlocking or bonding with the glass syringe. However, such fastening of the threaded member to syringes is often not sufficient. It may happen that when a syringe needle is screwed in, the mechanical or adhesive coupling does not hold and the threaded member rotates with it, especially if the user does not hold the threaded member while screwing in the syringe needle. Also, when using highly viscous formulations, it can happen that the syringe needle chips off together with the threaded member.

The described adhesive label enables the threaded member to be fixed, in particular in the form of a Luer-lock thread on syringes, so that in the case of use the Luer-lock thread is sufficiently firmly attached to the syringe. In addition, the adhesive label can be designed, in particular in coordination with the threaded member, to provide a first-opening indication. By means of the adhesive label, the container can be enclosed as by a second skin, so that the adhesive label can additionally provide a protective function, such as protection against UV radiation, for a medicament located in the container.

According to a preferred embodiment of the adhesive label, the strip-shaped fixing elements each have a predetermined orientation transverse to the first label portion and each enclose a predetermined angle with an adjacent edge of the first label portion. In this manner, a beneficial overlap of fixing elements can be established on the container, which contributes to a stable and reliable hold of the threaded member against unwanted twisting.

In particular, one or more of the fixing elements may each form an angle smaller than 90° or larger than 90° with the adjacent edge of the first label portion. With respect to a condition applied to the container, the fixing elements according to such an embodiment surround the circumference of the container body in a spiral shape and reliably counteract an undesired co-rotation of the threaded member when the container is opened.

According to another preferred embodiment of the adhesive label, some strip-shaped fixing elements enclose an angle smaller than 90° with the adjacent edge of the first label portion, and further strip-shaped fixing elements enclose an angle larger than 90°. According to such an embodiment, the adhesive label has a comb-like structure with sections facing each other. With respect to a condition applied to the container, the respective fixation elements surround the circumference of the container body in a spiral shape and come to rest on each other in sections. Preferably, the differently oriented portions of the comb-like structure are each formed externally at opposite ends of the adhesive label.

Preferably, the adhesive label and the fixing elements are designed to be so wide or long that an all-round label is realized with respect to the container which is to be provided with the adhesive label. When the adhesive label is applied, the first label portion is wrapped around the threaded member and the second label portion is wrapped around the body of the container, so that the fixing elements located on the outside cross over and cover each other in sections. In this way, a particularly stable hold of the adhesive label on the container can be established and a relative movement of the threaded member relative to the container body is reliably counteracted.

According to a further preferred embodiment of the adhesive label, the first label portion is further configured to extend into the region of a closure of the container and, in particular, to be attached thereto, so that the adhesive label further couples the closure to the container body. The adhesive label may thereby surround the closure more or less without contact and form a kind of sleeve therearound or alternatively be connected thereto, for example glued thereto. In particular, the first label portion of the adhesive label is adhesively coupled to the threaded member and can further surround the closure of the container in a sleeve-like manner without being adhesively coupled to or with the closure. The first label portion can thus surround the closure all around with respect to the longitudinal axis thereof without contact or without adhesion. An upper part of the first label section then forms a label sleeve that is open at the top with respect to the longitudinal axis. When the container is opened, the first label portion is then pressed against an outer surface of the closure and separated from a lower part of the first label portion and from the second label portion by pulling and/or turning and removed from the container body together with the closure of the container.

In the context of this description, terms such as “top” and “bottom” refer to an operational arrangement or application of the adhesive label and the container. This also applies to terms such as “head” and “body”, where the head is usually to be arranged at the top and the body usually at the bottom. The closure of the container forms, for example, as an upper portion, a head of an injection vial or syringe, and includes, for example, a cap, a lid, or a primary closure or cap which is removed to open the container. The body of the container then forms, for example as a lower portion, a receptacle of the injection vial or syringe for holding and storing a predetermined content.

The first label portion of the adhesive label is associated with the upper component of the container, and thus with the threaded member and/or the closure, and thus may be referred to as the upper label portion. The second label portion of the adhesive label is associated with the lower component of the container, and remains on the container body of the container or the receptacle of the container after opening, and may therefore also be referred to as the lower label portion. However, a reverse orientation and use of the adhesive label is also possible, in which the fixing elements are attached to the threaded member and fix it with respect to relative movements by means of the first label portion, which is then placed on the container body.

The described embodiments of the adhesive label, in which the upper label portion extends to the closure of the container, are particularly suitable for providing proof of opening in addition to the fixed hold of the threaded member and for forming a tamper protection. When the container is opened, the closure is removed from the threaded member and, for example, pulled or torn off together with a partial element of the first label portion from the remaining residue. Accordingly, the portion of the adhesive label remaining on the body of the container indicates that the container has been opened.

Furthermore, the first label portion is preferably formed such that there is only a narrow gap or space between the closure and the surrounding first label portion. Manipulation or an attempted opening by reaching into the narrow gap from above will result in tearing or crumpling of the first label portion, such that such an operation would leave detectable marks.

In particular, the adhesive label may be formed as a stick-on label such that it partially or completely covers the threaded member and the container body with respect to a circumference. Alternatively, the adhesive label may in particular be formed such that the first and/or the second label portion is formed in coordination with a circumference of the threaded member and/or the closure and/or the container body of the container to be provided with the adhesive label and has a predetermined length. Thus, the adhesive label may be partially or completely formed as a wrap-around label or an over-round label. For example, the first label portion is formed as an all-around section with respect to its length so that it completely encloses a circumference of the threaded member when applied and partially covers or overlaps itself, while the second label portion covers only a portion of the outer surface of the container body and does not enclose it all the way around. Alternatively, the second label portion is formed as a circumferential section with respect to its length, so that it completely surrounds a circumference of the container body during application.

According to a further preferred embodiment of the adhesive label, the first label portion is formed in coordination with a surface structure of the threaded member and/or the closure of the container to which the adhesive label is to be applied and has a predetermined punched-out portion or recess. In particular, such a recess may be formed as a punched-out recess complementary to an elevation or one or more protruding portions. For example, nubs or an annular protrusion are provided on the threaded member and/or the closure of the container, so that the adhesive label has circular or elongated or annular recesses adapted to the respective surface structure and corresponding to the surface structure. If the threaded member or the closure has, for example, a circumferential elevation, the adhesive label has, in coordination with such an elevation, an elongated recess which, when applied to the container, forms a substantially annular recess. The adhesive label thereby has at least one retaining web, preferably two spaced retaining webs or a plurality of equidistantly arranged retaining webs, so that the lower, second label portion is connected to the upper, first label portion.

According to a further preferred embodiment of the adhesive label, the first label portion is formed in coordination with a surface structure of the threaded element and/or the closure and has an at least partial multilayer structure. Alternatively or additionally, the second label portion with the comb-like structure may also be formed in coordination with a surface structure and/or a circumference of the container body of the container to which the adhesive label is to be applied and have an at least partial multilayer structure. For example, the adhesive label having multiple layers may compensate for different radii or diameters of a cylindrical container to which the adhesive label is to be applied. Small differences in diameter between the threaded member and the body of the container can already be overcome by the comb structure of the second label portion, even with only one layer. In addition, multiple layers can contribute to an opening detection, so that, for example, a section of an upper layer is separated in a predetermined manner when the labeled container is opened, and an underlying section of a lower layer is specifically exposed in order to clearly visibly mark an opening that has occurred. The exposed section of such a lower layer is, for example, marked in color or has a predetermined lettering, such as “used”, “open” or “opened”.

The adhesive label preferably has an adhesive layer arranged on an underside of the first and/or the second label portion, so that the adhesive label can be arranged on the container by means of adhesive. In this way, the adhesive label can be applied inexpensively, simply and reliably to the container provided for this purpose. The adhesive layer can completely or partially cover the underside of the adhesive label. In particular, the adhesive layer may be formed in a predetermined manner in coordination with a material or surface structure of the threaded member, the closure, and/or the container. An adhesive of the adhesive layer is specifically selected, for example, taking into account a surface roughness of the threaded member, in order to set up a stable hold of the adhesive label on the container and a reliable fixation of the threaded member.

According to a further preferred embodiment, the adhesive label, in particular the first label portion, has a severing region with a severing element, so that when the container applied with the adhesive label is opened, the adhesive label can be severed in a predetermined manner along the severing region, so that at least a first partial element of the first label portion can be removed, together with the closure of the container, from a second partial element of the first label portion and the container body of the container. In particular, the adhesive label may have an adhesive-free surface in the severing region so that, when the applied container is opened, simple and low-resistance severing of the adhesive label along the severing element is feasible.

In particular, the severing element may be in the form of a perforation and allow a predetermined tearing. Alternatively or additionally, the adhesive label can have a film or film element in the severing area that has a relatively low tear resistance, so that it is easy to tear and sever the film element and thus the adhesive label. Such a film element is formed, for example, as an acetate film and does not require a separate perforation or other weakening structure to enable easy tearing.

The adhesive label also has, for example, an adhesive area in an upper region of the first label portion facing away from the second label portion. The adhesive area of the first label portion is then adhered to a closure of the container, and can be removed from the remainder of the adhesive label and the threaded member or container body when the container is opened with the closure. Thus, no separate segment remains as waste for disposal.

Insofar as the applied adhesive label extends to a closure of the container and the closure or the adhesive label itself comprises a severing region, the adhesive label preferably has an adhesive-free surface in the severing region. Thus, easier severing of the adhesive label and removal of the severable portion of the first label section is enabled. A force required to separate the adhesive label is reduced compared to a fully adhesive label, and an opening dynamic of the container applied with the adhesive label is improved.

The respective severing region can be formed, in particular in coordination with the container to be applied, in a region of the adhesive label which, in an applied state on the container, is associated with a transition between the closure and the threaded member or the threaded member and the container body. The severing region is located, for example, in a region of a lower end of the closure. Sufficiently forceful twisting and/or pulling of the closure of the container then results in severing of the adhesive label. However, the severing region may also be arranged in other regions which allow the adhesive label to be severed when the container is opened. In particular, if the adhesive label has a multi-layer design, the severing region can be arranged, for example, significantly below the region of the lower end of the closure, so that an upper or outwardly directed layer of the adhesive label tears in a predetermined manner due to an acting tensile and/or rotational force.

In particular, a severing element, for example in the form of a perforation or a tear strip, can be provided in the severing region, which enables controlled severing of the adhesive label. In addition, the adhesive label may be formed, for example in the region of the first label portion, with predetermined surface properties that enable easier opening of the container and severing of the adhesive label by the user. Such beneficial surface properties can be realized, for example, with anti-slip lacquers, by means of printed tactile elements or a surface microstructuring, which enable a safer gripping of the first label portion.

According to a further embodiment, the adhesive label comprises an opening detection element which is integrated in or coupled to the first label portion and which is configured to indicate a removal of at least a first partial element of the first label portion from the second label portion and the container body of the container. In particular, the opening detection element can cooperate with the previously described severing element in the form of a perforation and can clearly indicate a predetermined tearing of the adhesive label. Furthermore, the opening detection element can be realized in the form of a colored area or a deposited lettering, which is exposed when the container provided with the adhesive label is opened.

In addition, the adhesive label can comprise an electronic opening detection element in the form of an RFID transponder which is coupled to the first label portion and which comprises a chip and an antenna structure which is connected to the chip by means of a conductor track. In particular, the conductor track extends into the severing region and covers the severing element at least in sections. When the container is opened, the conductor track is then cut in a predetermined manner and the interruption of the conductor track is detected by means of the RFID transponder. If the container provided with the adhesive label is opened, this can be read by means of a reader.

The adhesive label described helps to prevent the threaded member from rotating when the container is opened or a syringe needle is attached. In addition, the adhesive label can contribute to tamper protection with respect to the container, whereby, for example, an intactness of a medicament package can be guaranteed or such an intactness can be indicated. By means of a clearly recognizable indication of a successful initial opening, the adhesive label can indicate an unintentional or unauthorized reuse of the correspondingly labeled container after its use. Thus, by means of the adhesive label, the possibility of tampering with the container is also counteracted.

According to a further aspect, the invention comprises a use of an embodiment of the described adhesive label for a container divisible into a plurality of parts for fixing a threaded member to a container body of the container.

In accordance with another aspect of the invention, a system includes a multi-part container having a threaded member and a container body, and an adhesive label applied to the container such that a first label portion of the adhesive label is attached to the threaded member and a second label portion of the adhesive label is attached to the container body such that the adhesive label couples the threaded member to the container body and resists movement of the threaded member relative to the container body. The adhesive label may be formed as a full-surface label that is bonded to the threaded member and to the container body to secure the threaded member in place. Furthermore, the adhesive label of the system is preferably formed according to one of the previously described embodiments.

In that the use and the system particularly relate to or comprise an embodiment of the described adhesive label, described properties and features of the adhesive label are also disclosed for the use and for the system, and vice versa.

According to a preferred further embodiment of the system, the first, flat label portion is fixed to the threaded member of the container and the strip-shaped fixing elements of the comb-like structure of the second label portion are fixed to the container body of the container.

The system may further comprise a closure coupled to the container such that the threaded member is disposed between the container body and the closure, the first label portion then extending in particular to the closure or onto the closure. In particular, the adhesive label and the threaded member and/or the closure and/or the container body are formed in coordination with each other in a predetermined manner. This takes into account, among other things, geometries, surface structures and materials of the interacting components.

According to a further preferred embodiment, the system comprises an opening detection element coupled to the threaded member and/or the closure and configured to indicate a removal of the closure from the container body. Such an opening detection element of the container may be formed alternatively or in addition to the previously described opening detection element of the adhesive label. For example, the closure is connected to the threaded member by means of connecting webs which break open when the container is opened, thereby realizing a visible evidence of an opening having occurred.

In accordance with another aspect of the invention, a method of applying an adhesive label to a multi-part container having a threaded member and a container body comprises providing the container having the threaded member and the container body and providing the adhesive label having a first label portion and a second label portion adjacent the first label portion. The method further comprises attaching the adhesive label to the container such that the first label portion is attached to the threaded member of the container and the second label portion is attached to the container body of the container, such that the adhesive label couples the threaded member to the container body and resists movement of the threaded member relative to the container body.

In particular, the adhesive label is in the form of one of the previously described embodiments, such that attaching the adhesive label comprises attaching the fixing elements of the comb-like structure to the container body of the container. In this case, the fixing elements are wound around the container body, in particular in a spiral shape, and are fixed thereto in such a way that they form an overround label with respect to a circumference of the container body and at least one fixing element covers another fixing element in sections.

By means of the application method described, it is possible to apply the adhesive label to the container in a targeted manner in order to establish a secure and reliable hold of the threaded member and to secure or fix it against undesirable twisting relative to the container body. In that the method relates in particular to an application or attachment of an embodiment of the described adhesive label, the described properties and features of the adhesive label are also disclosed for the method and vice versa. In particular, the adhesive label described also enables subsequent fixing of a threaded member relative to a threaded body, for example of prefilled syringes.

In addition, the adhesive label can be attached to the container easily and inexpensively and does not require, for example, the application of temperature, as is the case with shrink film, which is placed around elements to secure them and shrunk by means of temperature application. Accordingly, however, temperature is then applied to the contents of the container and an associated process section is also required in a packaging line. The adhesive label described does not require the application of temperature and can be provided in the form of a film with a pressure-sensitive adhesive that can be easily and reliably applied to the container. The use of shrink films can therefore be eliminated.

In the following, the described adhesive label will be explained again for the most part using the example of a container of a two-part syringe, which can be realized in particular as a glass syringe or plastic syringe with an adapting Luer-lock thread. However, the properties and features can also be transferred with respect to other multi-part vessels which have a threaded member coupled as a separate component to an associated vessel body.

The adhesive label has a special label structure in which, in particular, the comb-like structure of the second label portion serves, on the one hand, to bridge the different circumference of the Luer-lock thread and the syringe body and, on the other hand, to reliably absorb forces when rotational forces occur.

The adhesive label enables simultaneous detection of the syringe body and the outside of the Luer-lock thread and, in various embodiments, also detection of the container closure if the adhesive label is also to be used for initial opening indication, and in this respect can be designed with a relatively high adhesion strength.

The outer side of the Luer-lock thread and optionally also that of the container closure are preferably designed so that they are flush with an outer surface of the syringe body. Thus, it is also possible to use a full-surface adhesive label that can be adhered to the syringe body as well as to the Luer-lock thread and optionally also to the closure of the container. In addition, the adhesive label can also be designed or used as a label which, in addition to fixing the Luer-lock thread, can optionally also provide a first-opening indication.

In a further preferred embodiment, the outside of the Luer-lock thread and optionally also the outside of the closure have a surface structure which is particularly suitable for adhesion of a pressure-sensitive label equipped with pressure-sensitive adhesive. The threaded member and optionally also the closure are designed in particular to match the adhesive label to be applied and vice versa. The threaded member and, if applicable, also the closure have, for example, surface structures with macroscopic and/or microscopic features and/or are made of preselected materials in order to set up a particularly stable hold of the adhesive label and a reliable fixation of the threaded member relative to the container body.

With regard to macroscopic features, the outer sides of the Luer-lock thread and/or the closure can be designed with a relatively large surface, which is circumferentially identical to the syringe body, in order to provide a correspondingly large adhesive surface for the adhesive label. Another possibility is that the surface structure of the outer side of the Luer-lock thread and/or the closure contains macroscopic protrusions which correspond to corresponding punch-outs in the adhesive label. Through such punched holes in the adhesive label, the protrusions on the outside of the Luer-lock thread and/or the closure can be pushed through, resulting in mechanical interlocking and contributing to a particularly stable hold. The bulges on the outside of the Luer-lock thread and/or the closure can, for example, realize regularly or irregularly distributed knobs or alternatively be designed as continuous, outwardly projecting structures which, with respect to a longitudinal axis of the syringe, extend essentially perpendicularly to the latter or obliquely thereto. Such protrusions may, for example, have a size of 0.5 mm to 5 mm. Bulges on the threaded member and/or the closure of a Luer-lock system may also have a size in a range of 1 mm to 2 mm. It is therefore useful to provide appropriately sized recesses in the adhesive label which are matched to the dimensions of the protrusions and are preferably designed to be slightly larger.

With regard to microscopic features, the area on the outside of the Luer-lock thread and/or the closure intended for application of the adhesive label can be designed to be as smooth as possible in order to achieve the best possible adhesion of the pressure-sensitive adhesive of the adhesive label. In the case of particularly flowable adhesives, it may be advantageous for the area on the Luer-lock thread and/or the closure intended for bonding with the pressure-sensitive label to have a predetermined roughness, which increases the surface area overall and thus the interaction with the pressure-sensitive adhesive.

With regard to a material selection for the thread member and/or the closure, it is advantageous, for example, to select plastics with a high surface energy at least for the outer area intended for bonding with the pressure-sensitive label, whereby wetting with pressure-sensitive adhesive can be improved. The surface energy of the material represents a measure of how strongly a pressure-sensitive adhesive spreads on the material. Plastics with a relatively high surface energy include polycarbonate and polyethylene terephthalate (PET). Alternatively, plastics can be subjected to plasma or corona treatment to specifically increase the surface energy. For example, a threaded member made of polyethylene provides a relatively low surface energy. Suitable pressure-sensitive adhesives for low-energy surfaces include rubber or silicone adhesives. A pressure-sensitive adhesive of the pressure-sensitive label is therefore preferably matched to a material of the threaded element and/or the closure, or vice versa.

In addition, it may be advantageous to provide the pressure-sensitive label with a pressure-sensitive adhesive having a high flowability so that possible unevenness, for example in the case of relatively rough surfaces of the threaded member and/or the closure, can be fully wetted with adhesive. Particularly flowable adhesives are, for example, modified acrylates and synthetic rubber.

In addition, the closure of the container may also be adapted to an adhesive label to be applied. For example, a bifurcation of the surface may be provided in a portion of the closure. A lower part of the closure, which faces the threaded member, is then specifically formed, for example, for adhesion of the adhesive label, while the upper part, which faces away from the threaded member, has, for example, grip aids, such as corrugations, which provide a preferred feel for opening the container.

In addition, it is conceivable that the closure is designed with at least two layers from the outside to the inside, with an outermost layer being formed in a predetermined manner for the adhesion of the adhesive label and an innermost layer of the closure meeting requirements for a primary packaging component.

The Luer-lock thread or threaded member and the closure of the container can be connected to each other with retaining webs. These then serve, for example, as a feature for initial opening indication. In such a case, it is sufficient if the adhesive label would only extend to a parting line between the Luer-lock thread and the closure, or would be applied to the container accordingly, so that the Luer-lock thread member is fixed to the syringe body.

If the Luer-lock threaded member and the closure are not connected to each other, the adhesive label can extend to the closure of the container. The adhesive label then has, for example, a perforation in the area below the closure and an adhesive neutralization above the perforation. During a rotational movement to open the syringe, the adhesive label tears along the perforation so that an upper part can be removed together with the closure.

Due to at least partial double-layering of the adhesive label, opening and removing the closure and a label segment can expose a colored area and/or lettering, making it possible to indicate an initial opening even more clearly. In this context, it is also possible to form a removable partial label or a partial element in a selectively removable manner, which can be used for documentation purposes, for example. It is also possible to integrate a tear strip as an opening mechanism in the adhesive label. In this case, a suitable perforation, if necessary together with a bulge in the adhesive label as a grip tab, makes it possible for the adhesive label underneath the closure to be destroyed in a rotationally targeted manner with the tear strip, and the closure can be removed together with the upper partial element of the adhesive label, which was arranged above the tear strip. The Luer-lock thread is always at least partially bonded to the remaining adhesive label even after removal of the closure and is thus connected to the syringe body, so that the Luer-lock thread is still fixed to the syringe. The adhesive label can also be formed and applied to the container in such a way that, before the syringe is opened, only the Luer-lock thread is gripped by the adhesive label and fixed relative to the syringe body.

If the closure and/or the Luer-lock thread are not flush with the body or the outer circumference of the syringe and a diameter of the closure and/or a diameter of the Luer-lock thread is larger than a diameter of the syringe body, an existing step in a transition of the closure to the Luer-lock thread and/or in a transition of the Luer-lock thread to the syringe body can be compensated by a partial multilayer structure of the adhesive label. However, the comb structure can already overcome certain differences in diameter.

If a first-opening indication is desired, this can be set up by optical features predetermined by destruction of the adhesive label. In addition, an electronic display option can be integrated in the adhesive label. In particular, the adhesive label can contain an RFID tag or an RFID transponder, which is connected to a printed conductor track. If this conductor track leads across a parting line between the closure and the threaded member or the syringe body, it is deliberately destroyed when the syringe is opened for the first time. Such a break in the conductor track can be detected and read out using RFID technology. In order to increase the read-out range of the RFID function, in the case of a Luer-lock thread and/or closure, which are formed, for example, circumferentially identically to the syringe body, the RFID transponder can be integrated in the region of the adhesive label, which is adhered to the Luer-lock thread and/or closure, so that during a read-out there is no detrimental interaction with the content, which is located in the syringe body.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
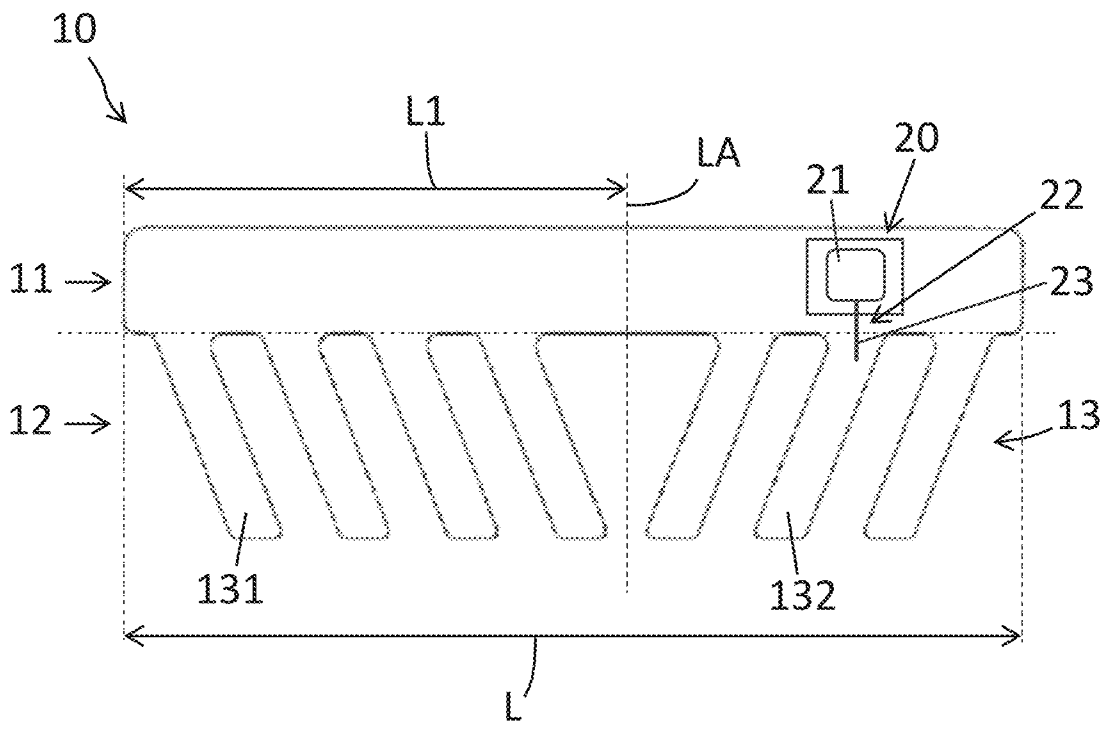
FIGS. 1-4 show embodiments of an adhesive label for a multi-part container.

Elements of the same design and function are identified with the same reference signs throughout the figures. For the sake of clarity, not all of the elements shown in all of the figures are identified with associated reference signs, possibly.

FIGS. 1-4 show embodiments of an adhesive label 10 for a multi-part container 30, which can be produced inexpensively and enables a threaded member 31 of the container 30 to be reliably fixed relative to a container body 32 of the container 30. In addition, by means of the adhesive label 10, a reliable initial opening proof can be realized with respect to the container 30 provided with the adhesive label 10.

The adhesive label 10 has a first label portion 11 and a second label portion 12 adjacent to the first label portion 11. The first label portion 11 is adapted to be attached, in particular adhered, to the threaded member 31 in a state applied to the vessel 30. The second label portion 12 is adapted to be attached to the container body 32 of the container 30 (see, for example, FIGS. 5, 6 and 9). The two label portions 11 and 12 of the adhesive label 10 preferably form mutually adjacent parts of a common material web.

The first label portion 11 has a planar shape. The second label portion 12 has a comb-like structure 13 with a plurality of strip-shaped fixing elements 131, 132 adapted to be fixed to the container body 32 of the container 30 so that the adhesive label 10 couples the threaded member 31 to the container body 32 and opposes a movement of the threaded member 31 relative to the container body 32.

In this way, the threaded member 31, which is usually placed and fitted on the container body 32, can be reliably fixed and secured against undesired rotation. It is a finding in connection with the present invention that a simple attachment of the threaded member 31, for example to the container 30 in the form of a syringe, is often not sufficient. It may happen that when a syringe needle is screwed in, a simple mechanical or adhesive coupling between the threaded member 31 and the syringe body 32 may not withstand and the threaded member 31 may undesirably rotate with it, in particular if the user does not hold the threaded element 31 while screwing in the syringe needle.

Figure 2:
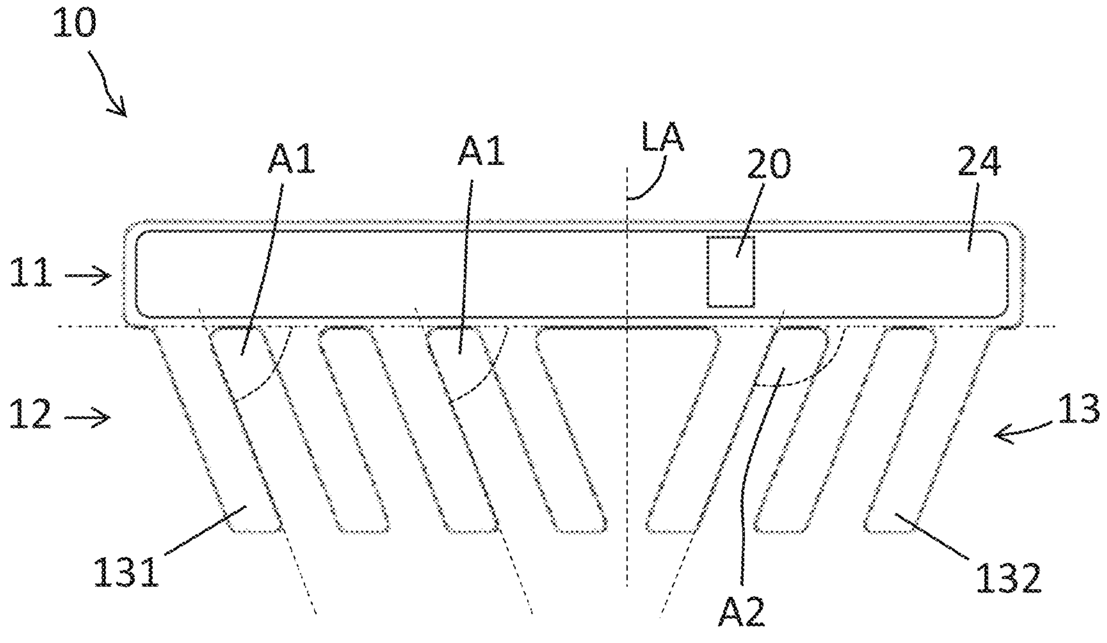

FIGS. 1 and 2 each show a schematic view of an embodiment of the adhesive label 10. The second label section 12 has a plurality of fixing elements 131 and 132, which are oriented differently. With respect to a longitudinal axis LA, which also corresponds to an orientation with respect to a longitudinal axis of the container 30 to which the adhesive label 10 is to be applied, the second label portion 12 has four fixing elements 131 and three fixing elements 132 which are aligned with each other and which each form an angle A1 and A2, respectively, with an edge of the first label portion 11 facing them. The four fixing elements 131 are aligned substantially parallel to each other. The three fixing elements 132 are also aligned substantially parallel to each other. In alternative embodiments, a different number of fixing elements 131 and 132 may also be formed. Furthermore, the same number of fixing elements 131 and 132 may be formed on both sides, or the adhesive label 10 may have more fixing elements 132 than fixing elements 131.

In particular, the angle A1 is formed smaller than 90° and the angle A2 is formed larger than 90°. For example, the angle A2 has a value dependent on the angle A1 and is determined by the relationship A2=180°−A1. In this way, the fixing elements 131 and 132 are oriented towards each other and overlap on the container body 32 in a diamond shape. In this case, the adhesive label 10 has a predetermined length L, which is designed in particular to match a circumference of the container 30 or of the container body 32 and/or of the threaded member 31. Preferably, the adhesive label 10 realizes an overround label, so that the length L is greater than the circumference of the threaded member 31 and/or of the container body 32.

Particularly preferably, the adhesive label 10 has a length L1 in the section in which the fixing elements 131 are formed, which is designed such that it corresponds approximately to the circumference of the container body 32 to be glued. After application, the fixing elements 132 of the comb-like structure 13 come to lie crossed on the fixing elements 131 or vice versa. In this way, the rotation of the threaded member 31 is counteracted in a particularly reliable manner.

In an alternative embodiment of the adhesive label 10, the length L is predetermined to be approximately equal to the circumference of the container 30, so that the adhesive label 10 forms a wrap-around label. Alternatively, the length L of the adhesive label 10 may be less than a circumference of the container 30 such that the adhesive label 10 covers only a portion of an outer surface of the threaded member 31 and/or the container body 32 with respect to the circumference. In another alternative embodiment, the fixing elements 131 and 132 may be formed oriented away from each other such that, for example, the fixing elements 131 include an angle A2 and the fixing elements 132 include an angle A1 with the first label portion 11.

The adhesive label 10 may be formed in a single layer or in multiple layers. With respect to a height or width, the adhesive label 10 may partially or completely cover the container 30 from the bottom to the top or extend from a foot-side end of the container body 32 to a head-side end of a closure 33 of the container 30 (see also FIG. 5). Alternatively, the adhesive label 10 may extend beyond a height or width of the container 30 and may also be applied to the closure 33 of the container 30 in addition to an exterior surface.

Figure 3:
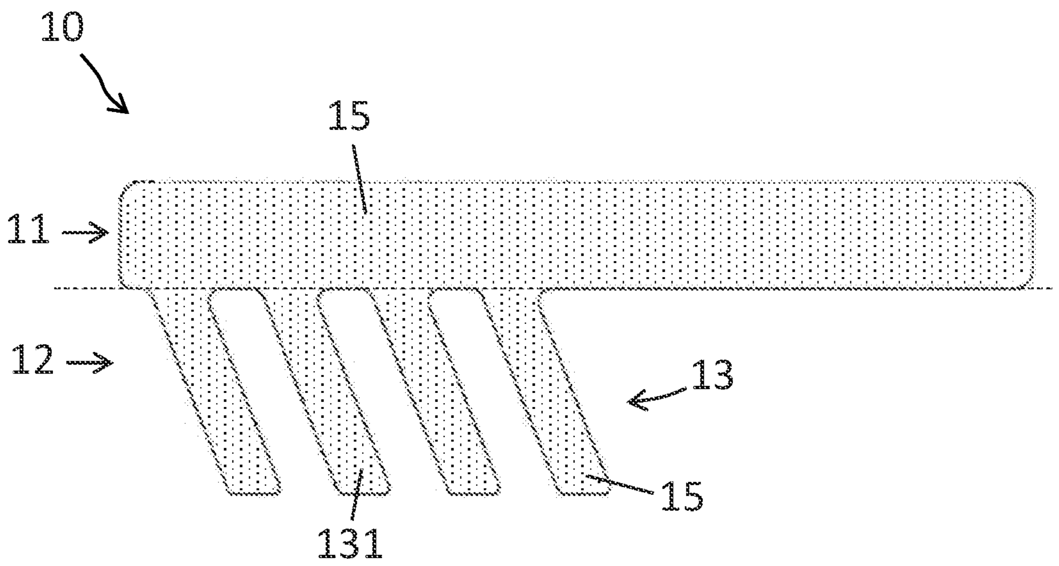
Figure 4:
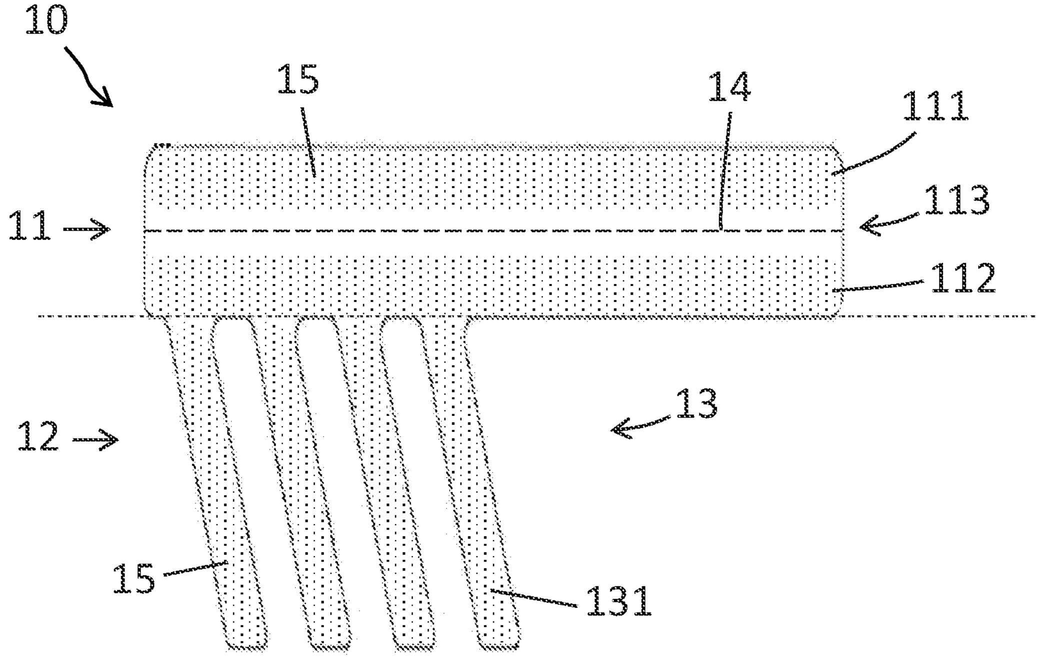

FIGS. 3 and 4 illustrate further embodiments of the adhesive label 10 in a schematic view, in each of which four fixing elements 131 are provided which are arranged in substantially the same orientation. In addition, it is illustrated that the adhesive label 10 has an adhesive layer 15 which completely or partially covers an underside of the adhesive label 10. In particular, the adhesive layer 15 serves to easily and reliably attach the adhesive label 10 to the threaded member 31 and the container body 32. In FIG. 3, the adhesive label 10 has a continuous adhesive layer 15 and forms a fully adhesive underside.

According to the embodiment shown in FIG. 4, the adhesive label 10 has an adhesive-free region 113 that is selectively formed in coordination with a region where a severing element 14 is provided. In particular, the severing element 14 may be formed in the form of a perforation that allows the adhesive label 10 to be severed in a simple and controlled manner. An upper, first partial element 111 of the first label portion 11 is bonded to the closure 33 of the container 30 prior to an opening of the container 30, while a second, lower partial element 112 is attached to the threaded member 31 of the container 30. The adhesive-free region 113 and the severing element 14 are then associated with a transition region between the closure 33 and the threaded member 31. When the container 30 applied with the adhesive label 10 is opened, the container 30 is predeterminedly severable along the severing element 14 so that the first partial element 111 is removable together with the closure 33 from the second partial element 112 and the container body 32. Such a removable partial element 111 can in particular also be used for documentation purposes and, for example, be stuck in a patient file.

Figure 5:
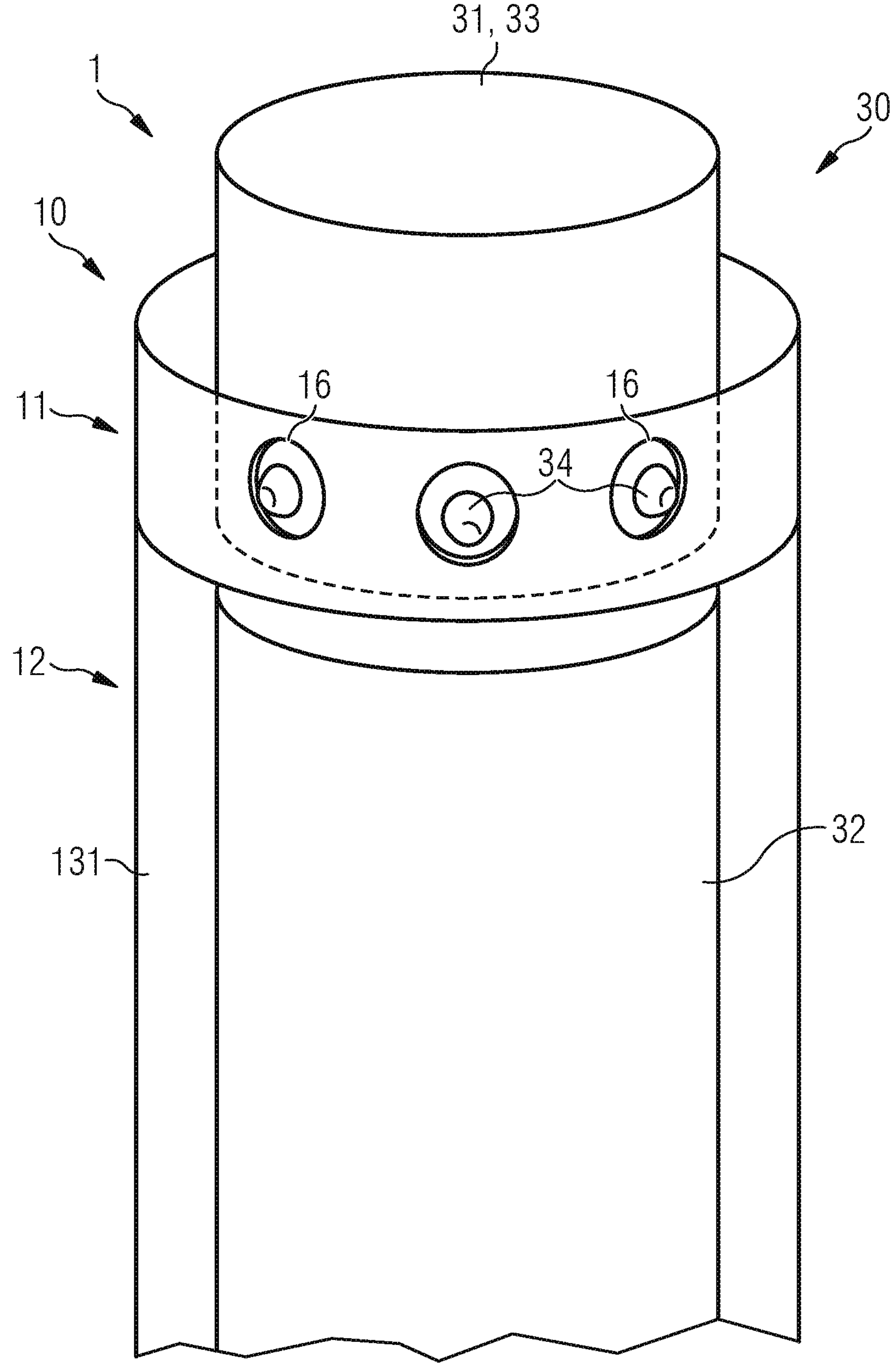
FIGS. 5-6 show various embodiments of a system comprising an adhesive label and a container.
Figure 6:
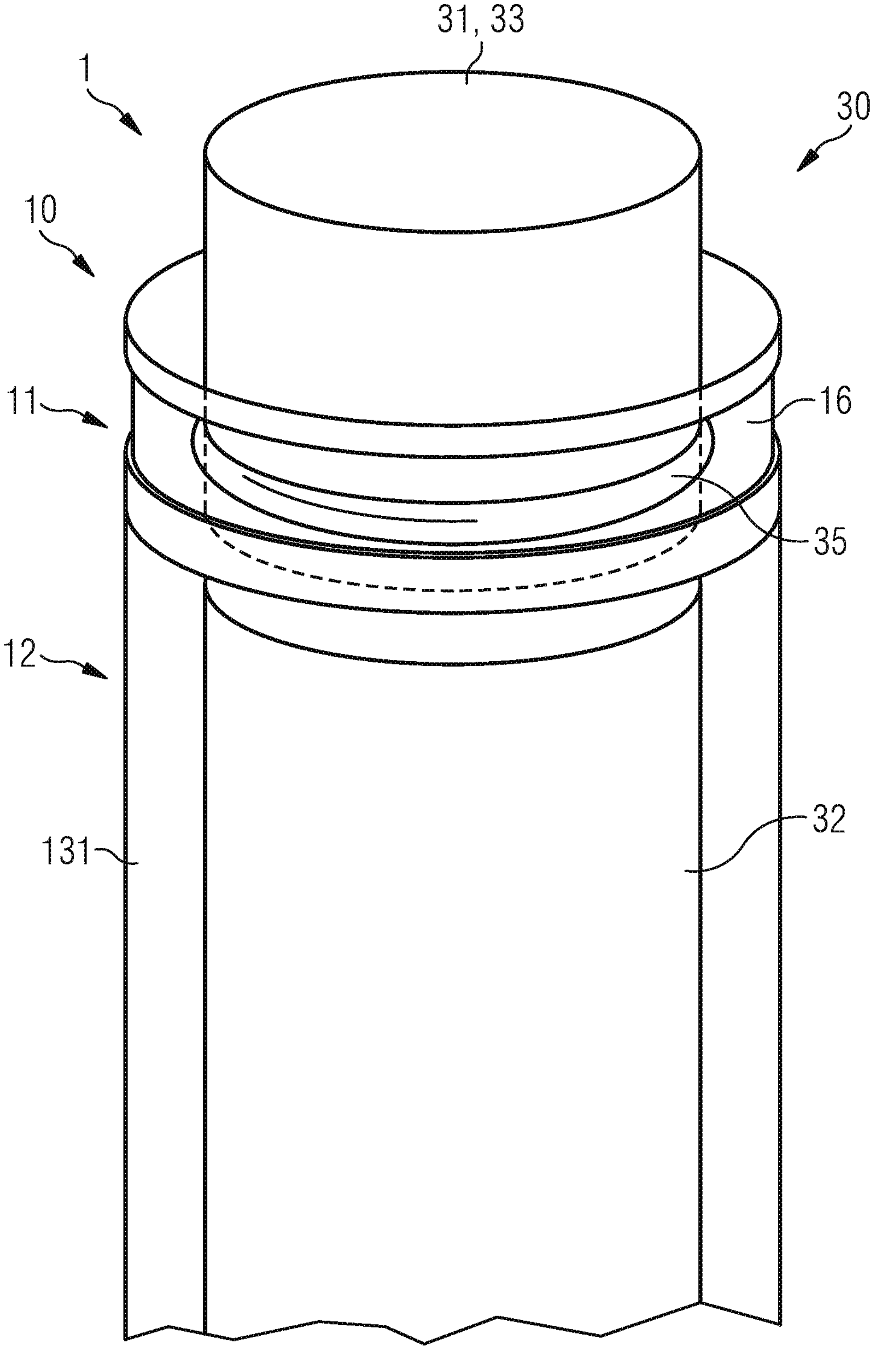

FIGS. 5 to 6 show various embodiments of a system 1 comprising the container 30 with the threaded member 31, the container body 32 and the closure 33, and an embodiment of the adhesive label 10. The closure 33 is twistably or peelably coupled to the container body 32, such that the threaded member 31 is disposed between the closure 33 and the container body 32. The container 30 or closure 33 and the adhesive label 10 are formed in coordination with each other, such that dimple-shaped protrusions 34 on an outer side of the closure 33 are accounted for by means of complementarily formed recesses 16 in the first label portion 11. The same can apply analogously to the threaded member 31, which can have protrusions 34 that are taken into account by means of the adhesive label 10, so that, in addition to an adhesive coupling, a mechanical interlocking of the adhesive label 10 with the threaded member 31 and/or the closure 33 can be set up.

The recesses or recesses 16 of the adhesive label 10 can be formed by means of punching out predetermined geometries. In particular, the upper portion of the container 31, 33 may represent a thread of a Luer-lock system of a COC/COP syringe. The embodiment example shown in FIG. 5 represents one possibility for a macroscopic interlocking of the adhesive label 10 with the outside of the Luer-lock thread 31.

FIG. 6 shows another embodiment of the system 1, in which the container 30 or the Luer-lock thread 31 and the adhesive label 10 are formed to match each other. The closure 33 or threaded member 31 has an elongated annular bead or protrusion 35 accounted for by a corresponding elongated recess 16 in the first label portion 11 of the adhesive label 10. The second label portion 12 is attached to the container body 32 and couples the threaded element 31 to the container body 32, such that relative movement of the two components is prevented or at least resisted. In this regard, the adhesive label 10 may be of a full-surface design or preferably, as illustrated in FIGS. 1 to 4, have a comb-like structure 13 forming the second label portion 12.

Figure 7:
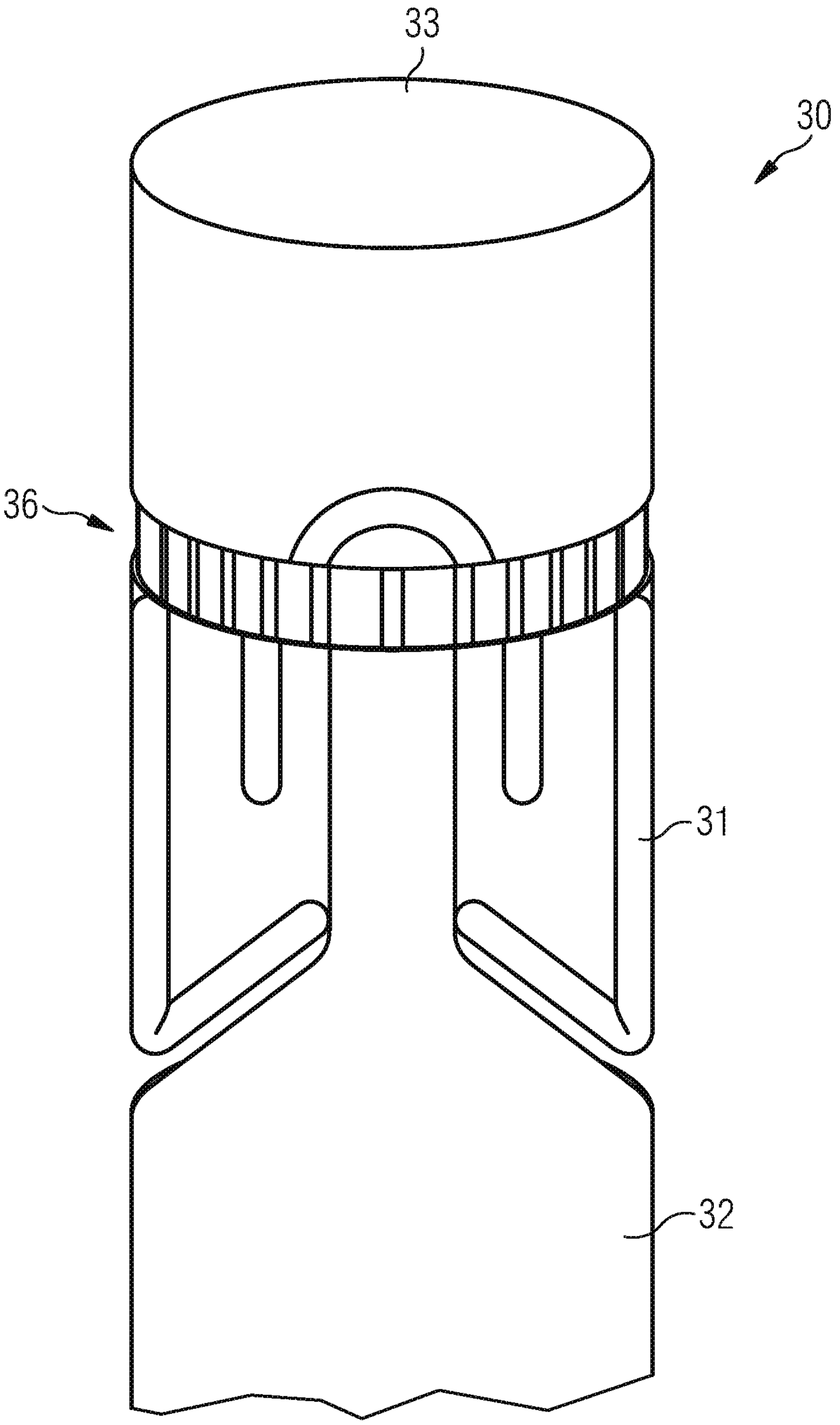
FIGS. 7-8 show various embodiments of a container having a threaded member and a container body.
Figure 8:
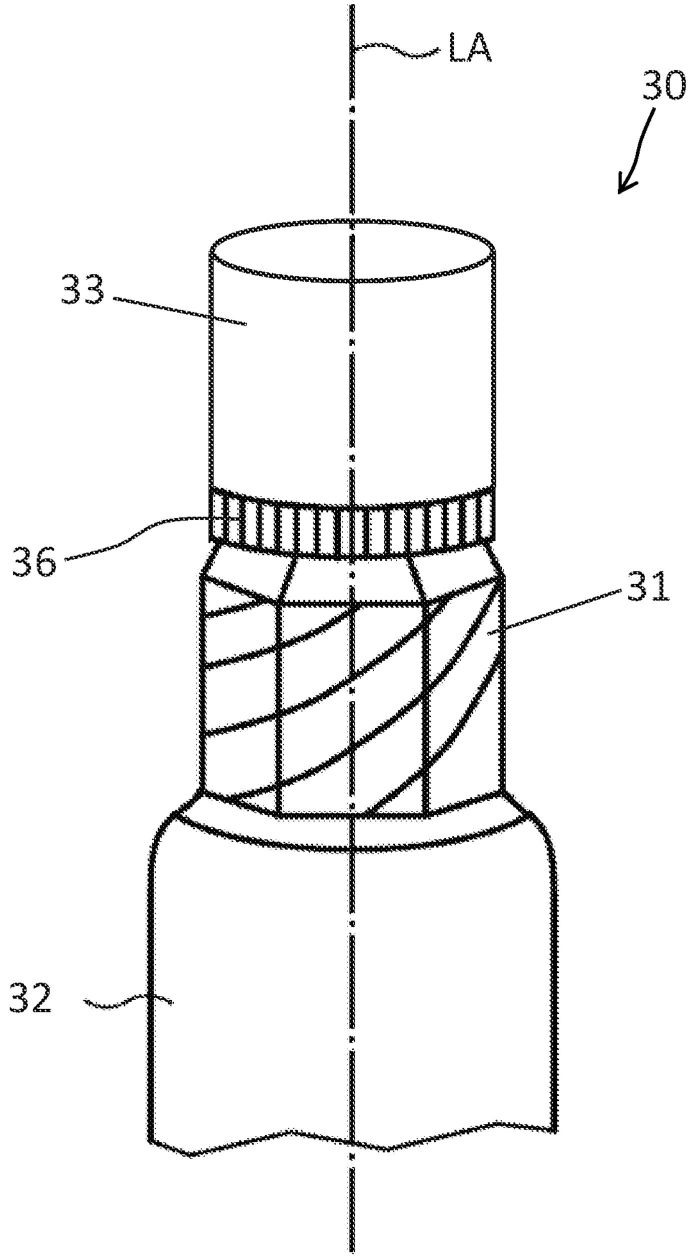

FIG. 7 shows, in a schematic sectional view, the container 30 with the closure 33 coupled to the exposed or fitted threaded member 31 by means of a plurality of connecting webs 36. The threaded member 31 is, for example, mechanically hooked and frictionally and/or positively coupled to the container body 32 or alternatively or optionally additionally bonded thereto. Furthermore, the threaded element 31 is secured against undesired twisting relative to the vessel body 32 by means of the adhesive label 10 to be applied. FIG. 8 shows a further embodiment of the container 30, which has a similar structure to that shown in FIG. 7.

Figure 9:
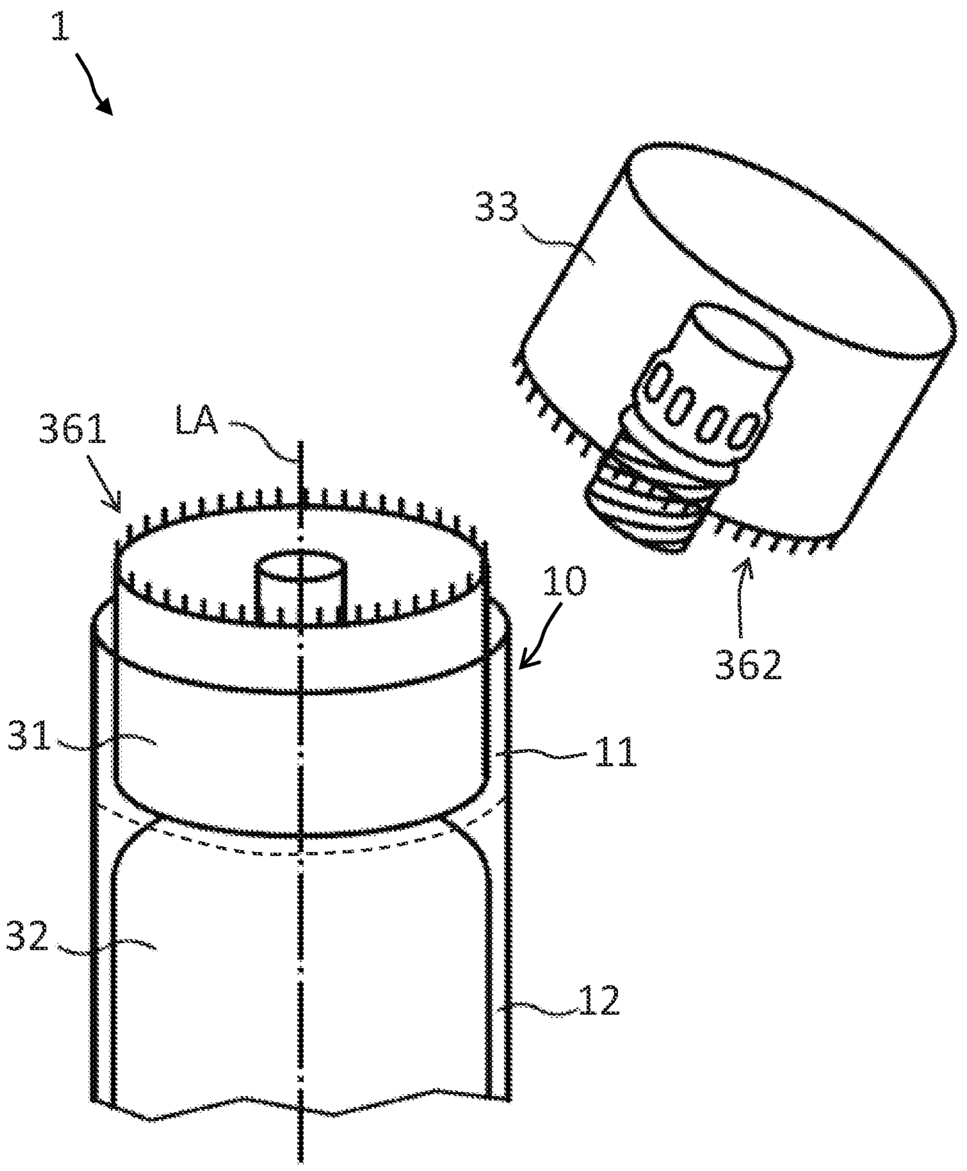
FIGS. 9-12 show further embodiments of the system with an adhesive label and a container.

FIG. 9 schematically illustrates the system 1 in which the adhesive label 10 is attached to the container 30 as shown in FIGS. 7 and 8. FIG. 9 further illustrates an opened state of the container 30, wherein the closure 33 has been removed from the container body 32 by twisting and/or pulling, thus opening the container 30. Referring to FIGS. 7 and 8, the connecting webs 36 have been broken open by rotating and/or pulling the closure 33 and remain coupled to the closure 33 or to the container body 32 as partial segments 361 and 362 of a respective connecting web 36. In particular, the broken-open connecting webs 36 or the remaining partial segments 361 and 362 can realize a first-opening proof that recognizably indicates that a first opening has already occurred. According to such an embodiment, the adhesive label 10 may extend only to the threaded member 31 and may not itself have a cut-through area. Alternatively, the adhesive label 10 can extend to the closure 33 and additionally have a severing area 141 (see FIGS. 10 to 12).

Figure 10:
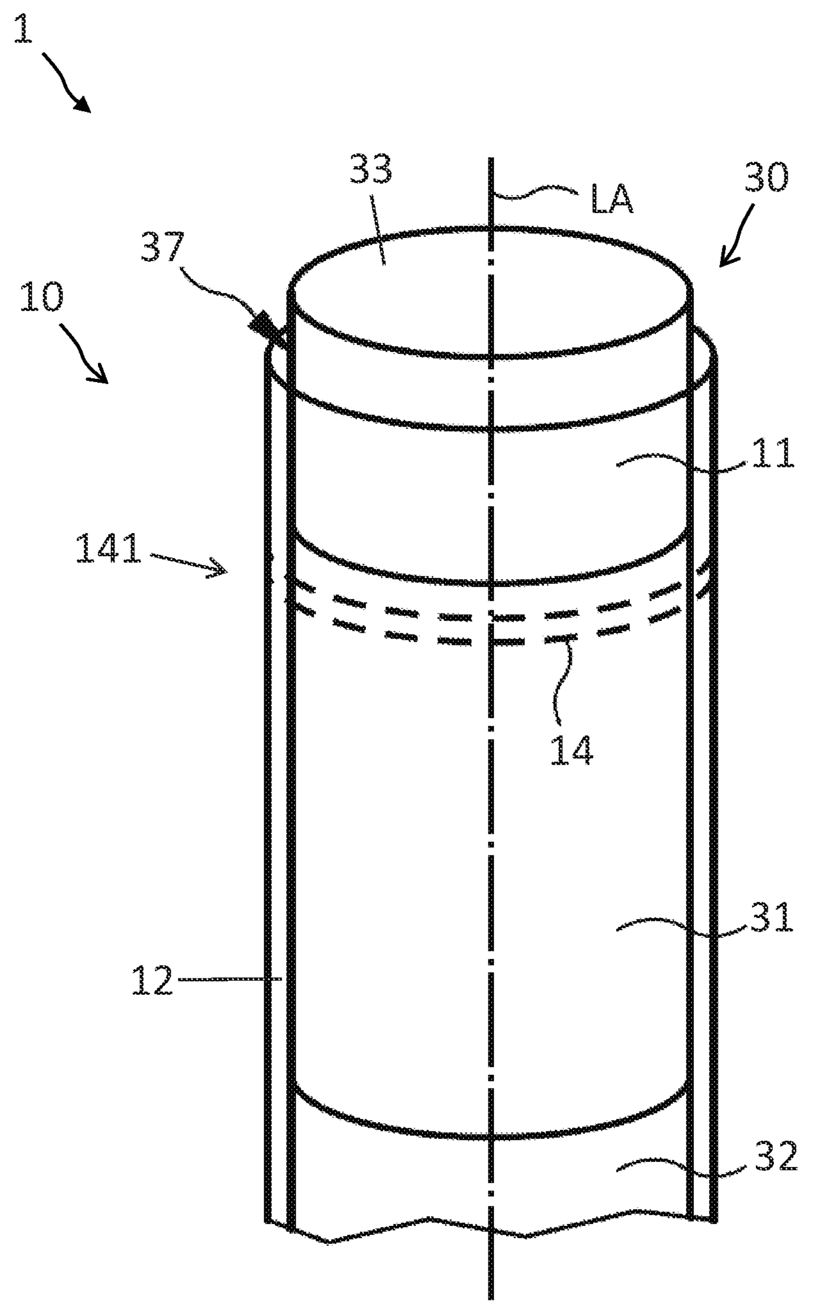

FIG. 10 shows an example of an embodiment of the system 1 with the adhesive label 10 extending to the closure 33 of the container 30 and having the severing area 141 with the severing element 14 in the form of one or more perforations between the first and second label portions 11 and 12. The perforations allow for a controlled and predetermined tearing of the adhesive label 10, and are provided as a purposefully formed line of weakness in the adhesive label 10.

Figure 11:
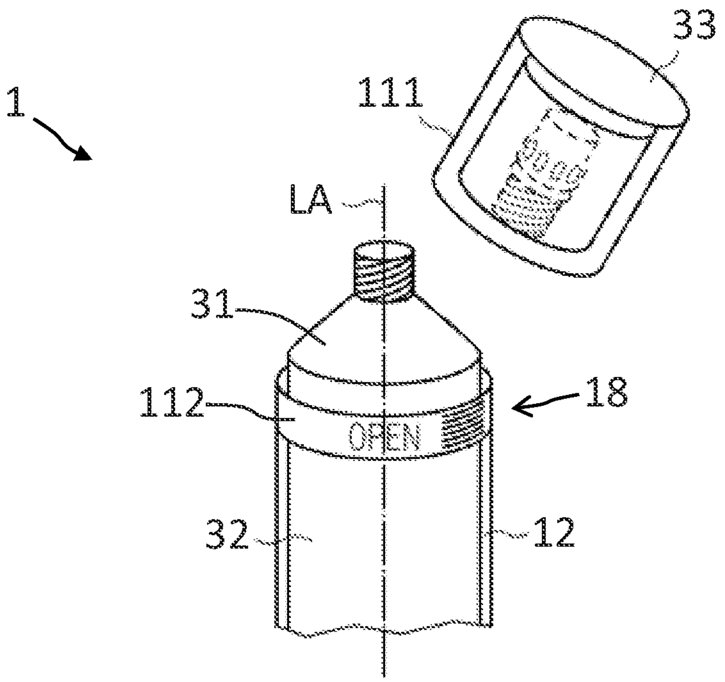
Figure 12:
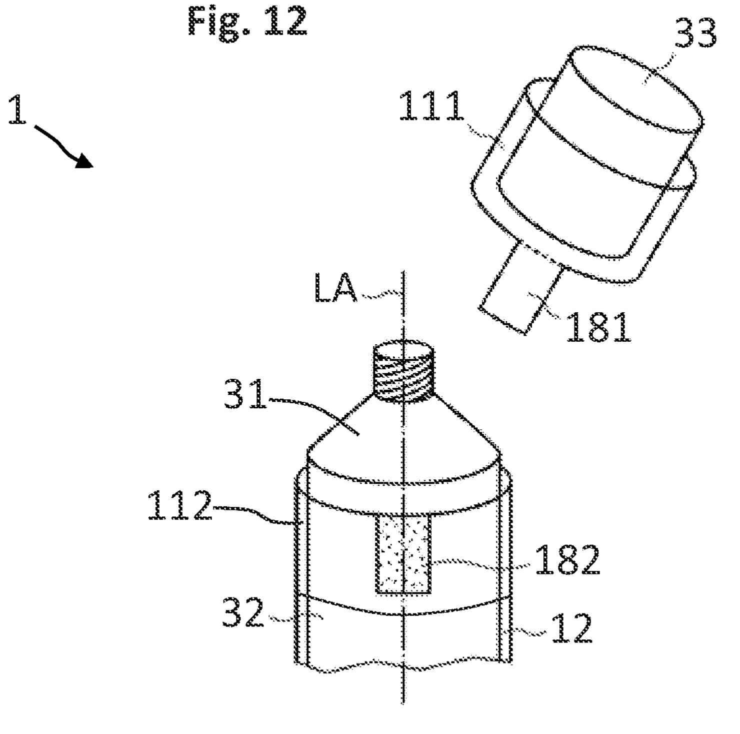

FIGS. 11 and 12 illustrate further embodiment examples of the system 1, which may be based on an embodiment according to FIG. 10. FIGS. 11 and 12 each illustrate an opened state of the container 30, in which a completed initial opening is indicated by means of an opening detection element 18 of the adhesive label 10. The adhesive label 10 has been cut in a predetermined manner when the container 30 is opened, so that the upper, first partial element 111 of the first label portion 11 remains on the closure 33 and the lower, second partial element 112 of the first label portion 11 remains on the threaded member 31 of the container 30. The opening proof element 18 represents a clearly recognizable indication in the form of a lettering that the container 30 is open or that an initial opening has already occurred. The opening detection element 18 may be provided by an at least partial double or multilayer of the adhesive label 10. For example, the first label portion 11 is double-layered and has "OPEN" written on a lower label layer facing the threaded member 31 in the severing area 141.

The first partial element 111 of the first label portion 11 then extends, for example, onto the second partial element 112 or at least onto a section of the second partial element 112 and covers the lettering in a non-opened state of the container 30 or a non-cut state of the adhesive label 10, so that the opening detection element 18 is not yet visible from the outside. Alternatively, the first label portion 11 may be configured as separable from the second label portion 12 so that the first label portion 11 covers a part of the second label portion 12 and a double layer is provided in the area of the opening detection element 18. Upon opening, the first partial element 111 or the first label portion 11 is removed together with the closure 33. Thus, the overlap area between the first and second partial elements 111 and 112 or between the first and second label portions 11 and 12 is separated and the opening detection element 18 is exposed.

FIG. 12 shows another embodiment of the adhesive label 10, in which the opening detection element 18 comprises a first partial element 181 and a second partial element 182. The first partial element 181 may be formed as an extended portion of the first label portion 11 or the upper, first partial element 111, which covers the second partial element 182 in a non-opened state of the container 30. The adhesive label 10 has, for example, a perforation in the region of the opening element 18 which is predetermined to tear when the container 30 is opened and the closure 33 is removed. In this way, the second partial element 182 is exposed, which is configured, for example, as a clearly identifiable colored surface. In particular, the colored area of the second partial element 182 serves as an initial opening indication, but also the first partial element 181 of the opening detection element 18 projecting from the first partial element 111 of the first label portion 11 forms a recognizable initial opening indication as a label flag.

Figure 13:
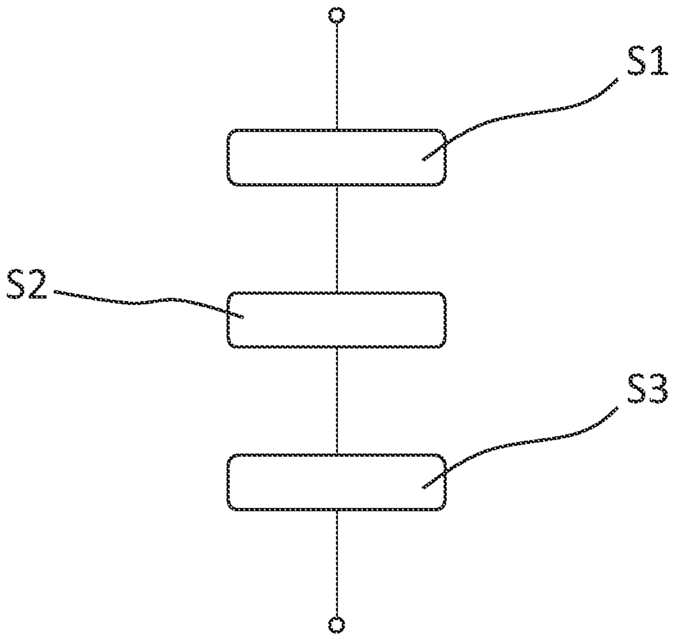
FIG. 13 shows a flow diagram for a method of applying an adhesive label to a multi-part container.

FIG. 13 shows an embodiment example for a flow chart of a method for applying or attaching the adhesive label 10 to the multi-part container 30. In a step S1, the container 30 is provided with the threaded member 31 and the container body 32 and optionally with the closure 33. The container 30 can be designed in accordance with the adhesive label 10 to be applied and can, for example, provide a flush surface structure 37 which is useful for reliable adhesion of the adhesive label 10 (see FIG. 10).

This may include that the material of the threaded member 31 and/or the closure 33 is a material with a high surface energy, so that a pressure-sensitive adhesive of the adhesive layer 15 of the adhesive label 10 is beneficially distributed on the outer side of the threaded member 31 and/or the closure 33 and forms a reliable adhesive force. Alternatively or additionally, the surface structure 37 on the outer side of the threaded member 31 and/or of the closure 33 can be selectively roughened and enable advantageous adhesion due to the roughness.

Further, providing the adhesive label 10 with the first and second label portions 11 and 21, the adhesive label 10 may be provided in particular with the adhesive layer 15 and a comb-like structure 13 that enable reliable attachment to the container 30 and counteract undesired rotation of the threaded member 31 relative to the container body 32. The adhesive label 10 may further be provided with one or more recesses 16, which take into account a corresponding surface structure 37 comprising protrusions 34 and/or 35.

In a further step S2, an attachment of the adhesive label 10 to the container 30 is performed in such a way that the first label portion 11 is attached to the threaded member 31 and, optionally, also to the closure 33 of the container 30.

In a further step S3, the adhesive label 10 is applied to the container 30 in such a way that the second label portion 12 is attached to the container body 32 of the container 30.

Steps S2 and S3 may be performed sequentially, simultaneously, or in reverse order. In each case, it is ensured that adhesive label 10 is applied to container 30 such that it couples threaded member 31 to container body 32 and opposes movement of threaded member 31 relative to container body 32.

The described adhesive label 10 enables a reliable fixation of a Luer-lock thread of a syringe in a simple and cost-effective manner, so that a rotation of the thread element 31 is counteracted when the container 30 is opened or a syringe needle is screwed in. This relates in particular to syringes which are made of glass or plastic and have a Luer-lock thread made of plastic. In this case, the thread is fixed to the syringe, but may not be sufficiently connected to the syringe body to withstand rotational forces. When the Luer-lock thread is connected to a syringe needle, the force applied can be so great that the simple fixation breaks, causing the Luer-lock thread to spin. As a result, further, incorrect attachment of the syringe needle to the container 30 may occur.

By means of the adhesive label 10, a stable and reliable hold of the threaded member 31 to the container body 32 can be contributed to. For example, the adhesive label 10 is wrapped around the syringe body 32 of the syringe 30 as well as around Luer-lock threads 31 and optionally around a syringe cap or closure 33 of the syringe 30. A choice of a pressure-sensitive adhesive of the adhesive layer 15 may be made in particular in coordination with a microscopic surface condition of the syringe body 32, the Luer-lock thread 31 and/or the closure 33. In addition to the fixation of the thread member 31, further functions can be provided by means of the adhesive label 10, such as, for example, a first-opening indication (also electronically by means of an integrated RFID functionality) and a protection against UV radiation, against penetration or leakage of a solvent, air humidity and/or other small-molecule substances.

Although only a few embodiments of the present invention have been shown and described, it is to be understood that many changes and modifications may be made thereunto without departing from the spirit and scope of the invention.

LIST OF REFERENCE SIGNS

1 system
10 adhesive label
11 first label portion
111 first partial element of the first label portion
112 second partial element of the first label portion
113 adhesive-free region of the label portion
12 second label portion
13 comb-like structure
131 fixing elements
132 fixing elements
14 severing element/perforation/film element
141 severing area
15 adhesive layer
16 recess
18 opening detection element
181 first partial element of the opening detection element
182 second partial element of the opening detection element
20 RFID transponder
21 chip
22 antenna structure
23 conductor track
24 protective layer

30 container/syringe
31 threaded member/Luer-lock thread
32 container body/syringe body
33 closure
34 protrusion
35 protrusion
36 connecting web between the closure and the threaded member
361 partial segment of the connecting web
362 partial segment of the connecting web
37 surface structure of threaded member/closure
A1 first angle
A2 second angle
L length of the adhesive label
L1 length of a section of the adhesive label
LA longitudinal axis
S(i) step of a method for applying an adhesive label

What is claimed is:

1. A system comprising:

a multi-part syringe having a threaded member and a syringe body, and an adhesive label applied to the syringe such that a first label portion of the adhesive label is attached to the threaded member (31) and a second label portion of the adhesive label adjacent to the first label portion is attached to the syringe body, such that the adhesive label couples the threaded member to the syringe body, the adhesive label having an RFID transponder coupled to the first label portion and comprising a chip and an antenna structure connected to the chip by means of a conductor track, wherein the first label section comprises a severing element, the conductor track of the RFID transponder covering the severing element at least in sections, such that when the syringe applied with the adhesive label is opened, the adhesive label and the conductor track can be severed in a predetermined manner along the severing element and an opening of the syringe can be indicated electronically by means of the RFID transponder.

2. The system according to claim 1, comprising:

a closure coupled to the syringe body such that the threaded member is disposed between the syringe body and the closure, wherein the first label portion extends to the closure.

3. The system according to claim 1, wherein the threaded member is formed as a Luer-lock thread and the syringe is formed as a Luer-lock syringe.

4. The system according to claim 3, wherein the first label portion of the adhesive label is attached to the Luer-lock thread and the second label portion of the adhesive label is attached to the syringe body and the adhesive label counteracts a movement of the threaded member relative to the syringe body.

5. The system according to claim 1, wherein the adhesive label comprises an initial opening indicator configured to predeterminedly sever the adhesive label and to indicate an opening of the syringe when the syringe applied with the adhesive label is opened.

6. The system according to claim 1, wherein the first label portion comprises a severing element, such that when the syringe applied with the adhesive label is opened, the adhesive label can be cut through in a predetermined manner along the severing element and at least a first partial element of the first label portion can be removed together with the closure of the syringe from the second label portion and the syringe body of the syringe and an opening of the syringe is visually indicative.

7. The system according to claim 1, wherein the syringe body and the threaded member and/or the closure are formed circumferentially identically.

8. The system according to claim 1, wherein the adhesive label comprises a protective layer providing a protective function against UV radiation, against penetration or leakage of a solvent, humidity and/or another small molecular substance.

9. The system according to claim 1, wherein the threaded member and/or the closure is formed with an outer surface that is circumferentially coextensive with an outer surface of the syringe body, thereby providing a predetermined adhesive surface for the adhesive label.

10. The system according to claim 1, wherein the threaded member and/or the closure is formed with an outer surface that is configured to be predetermined smooth in coordination with an adhesive of the adhesive label, thereby providing a predetermined adhesion for the adhesive of the adhesive label.

11. The system according to claim 1, wherein the threaded member and/or the fastener is formed with an outer surface having a predetermined roughness.

12. The system according to claim 1, wherein the RFID transponder is integrated in an area of the adhesive label arranged on the threaded element and/or the closure of the syringe.

13. The system according to claim 1, wherein the adhesive label is formed as a full-area RFID label and covers the threaded element and/or the syringe body and/or the closure.

14. The system according to claim 1, wherein the second label portion comprises a comb-like structure with a plurality of strip-like fixing elements adapted to be attached to the syringe body of the syringe.

15. A system comprising:

a multi-part syringe having a closure and a syringe body, and an adhesive label applied to the syringe such that a first label portion of the adhesive label is attached to the closure and a second label portion of the adhesive label adjacent to the first label portion is attached to the syringe body, such that the adhesive label couples the closure to the syringe body, the adhesive label having an RFID transponder coupled to the first label portion and comprising a chip and an antenna structure connected to the chip by means of a conductor track, wherein the first label section comprises a severing element, the conductor track of the RFID transponder covering the severing element at least in sections, such that when the syringe applied with the adhesive label is opened, the adhesive label and the conductor track can be severed in a predetermined manner along the severing element and an opening of the syringe can be indicated electronically by means of the RFID transponder.

* * * * *